Feb. 19, 1963 — E. J. PREMO ETAL — 3,078,119
VEHICLE CLOSURE
Filed Aug. 1, 1960 — 2 Sheets-Sheet 1

INVENTOR.
Ellis J. Premo, &
BY Robert J. Williams
Herbert Furman
ATTORNEY

Feb. 19, 1963   E. J. PREMO ETAL   3,078,119
VEHICLE CLOSURE
Filed Aug. 1, 1960   2 Sheets-Sheet 2
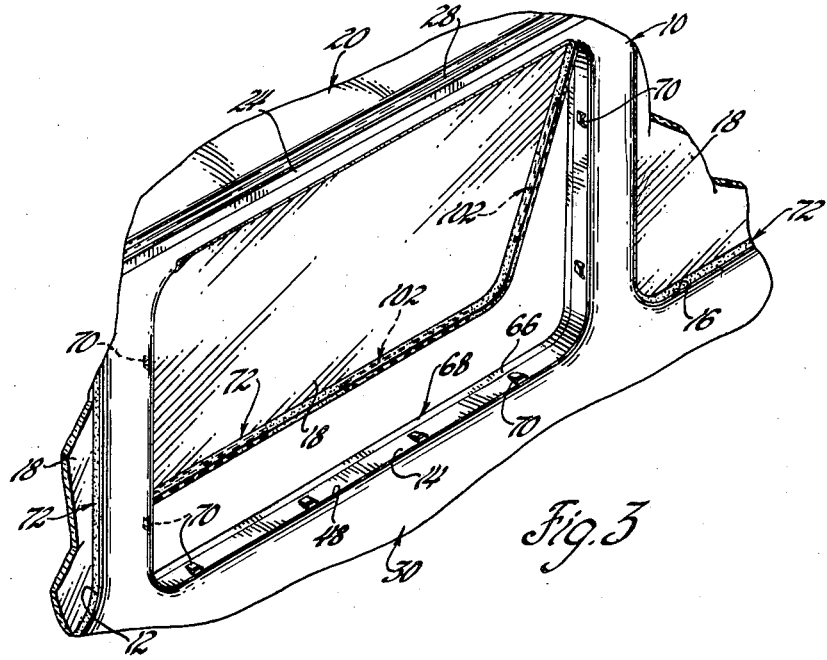
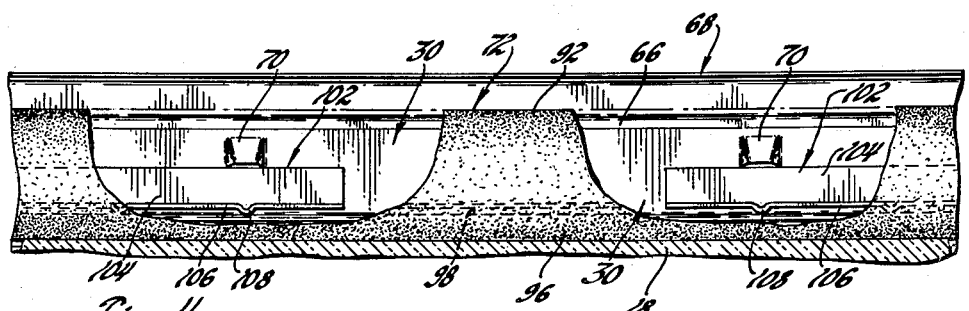
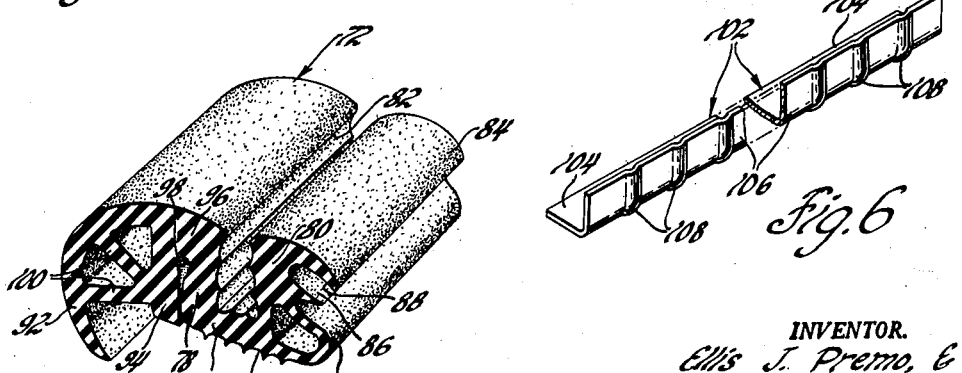
INVENTOR.
Ellis J. Premo, &
BY Robert J. Williams
Herbert Furman
ATTORNEY United States Patent Office 3,078,119
Patented Feb. 19, 1963

3,078,119
VEHICLE CLOSURE
Ellis J. Premo, Franklin, and Robert J. Williams, Washington, Mich., assignors to General Motors Corporation, Detroit, Mich., a corporation of Delaware
Filed Aug. 1, 1960, Ser. No. 46,425
5 Claims. (Cl. 296—44)

This invention relates to vehicle closures and more particularly to vehicle window mounting means.

The mounting means of this invention allows a fixed vehicle window to be easily and quickly mounted within a vehicle window opening from the inside of the body and further includes a new and improved weatherstrip which seals the window within the window opening and also provides both the inside and the outside trim or garnish moldings for the window.

At the present time a fixed vehicle window, such as a windshield or a backlight, is usually mounted on the body from the outside thereof by means of a weatherstrip which includes oppositely opening channels, the outboard channel receiving the edge portion of the window and the inboard channel receiving the body pinchweld structure which extends continuously around the window opening Since the body pinchweld structure is inboard of the window, the window is first assembled to the weatherstrip, the weatherstrip and window unit is then inserted within the window opening from the exterior of the body, and finally the pinchweld channel of the weatherstrip is assembled to the body pinchweld structure in order to fixedly mount the window within the window opening. Due to production variations in both the window and the body pinchweld structure, the weatherstrip may not always provide a continuous and effective seal between the window and the body so as to result in both air and moisture leaks.

In the preferred embodiment of this invention, the weatherstrip is provided with oppositely opening channels, the outboard one of which receives an edge portion of the window. The body is provided with a continuous outer wall portion extending inwardly of the window opening and a body pinchweld structure which is spaced inwardly of this wall portion along one side only of the window opening. The other sides of the window opening are provided with a plurality of spaced abutments which are also spaced inwardly of the outer wall portion a distance greater than the spacing between the body pinchweld structure and the outer wall portion at the one side of the opening. The weatherstrip is first assembled to the window, and then a plurality of angular locking members are inserted within the inboard channel of the weatherstrip at the portions of the weatherstrip corresponding to the other sides of the window opening. Thereafter the window and weatherstrip unit is angularly inserted within the window opening from the interior of the body to fit one side portion of the weatherstrip within the channel provided between the body pinchweld structure and the outer wall portion at the one side of the window opening, with the inboard channel of the weatherstrip receiving the body pinchweld structure. The window and weatherstrip unit is then pivoted outwardly of the body until the other side portions of the weatherstrip tightly engage the outer wall portion of the window opening as the locking members are snapped behind the abutments on the other sides of the window opening to thereby securely lock the window and the weatherstrip in place.

The primary object of this invention is to provide a new and improved vehicle window mounting means which permits a vehicle window and weatherstrip assembly to be mounted on a vehicle body from the interior thereof. Another object of this invention is to provide an improved vehicle window mounting means for vehicle windows which permits the window to be easily and quickly mounted on the body from the interior thereof and effectively prevents any leakage of either air or moisture into the body despite production variations in both the window and the body structure. A further object of this invention is to provide a new and improved vehicle window mounting means which permits a vehicle window to be easily and quickly mounted within a vehicle body window opening, with the mounting means including means permitting the window to be easily and quickly removed for servicing or otherwise. Another object of this invention is to provide a new and improved weatherstrip for vehicle closures.

These and other objects of this invention will be readily apparent from the following specification and drawings wherein:

FIGURE 3 is a perspective view showing an intermediate step in the mounting of the window of the body;

FIGURE 4 is an enlarged partially broken away view taken generally along the plane indicated by line 4—4 of FIGURE 1;

FIGURE 5 is an enlarged perspective view of a portion of the weatherstrip of this invention; and FIGURE 6 is a perspective view of one of the locking members of the window mounting means of this invention.

Figure 1:
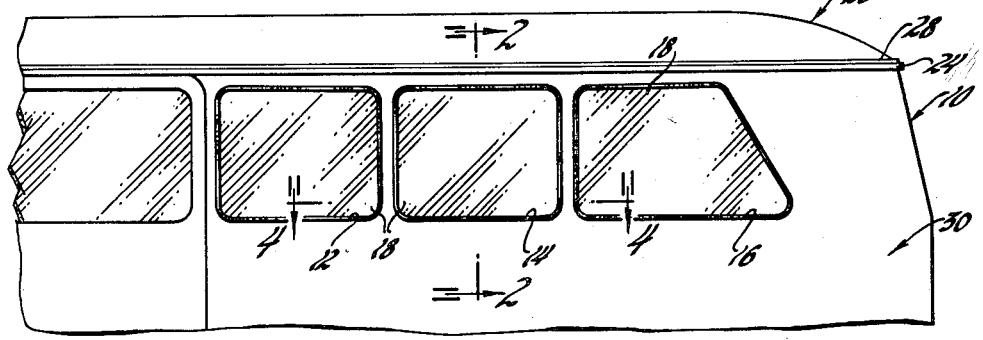
FIGURE 1 is a partial side elevational view of a vehicle body having a window opening therein and a window mounted on the body within the opening by window mounting means according to this invention.

Referring now to FIGURE 1 of the drawings, a vehicle 10 includes a plurality of window openings 12, 14 and 16, respectively, each of which is closed by a fixed vehicle window 18. Windows 18 are mounted within the window openings 12, 14 and 16 by window mounting means according to this invention. Since the mounting means is the same for all windows, only the mounting means mounting the window 18 within the window opening 14 will be hereinafter particularly described.

Figure 2:
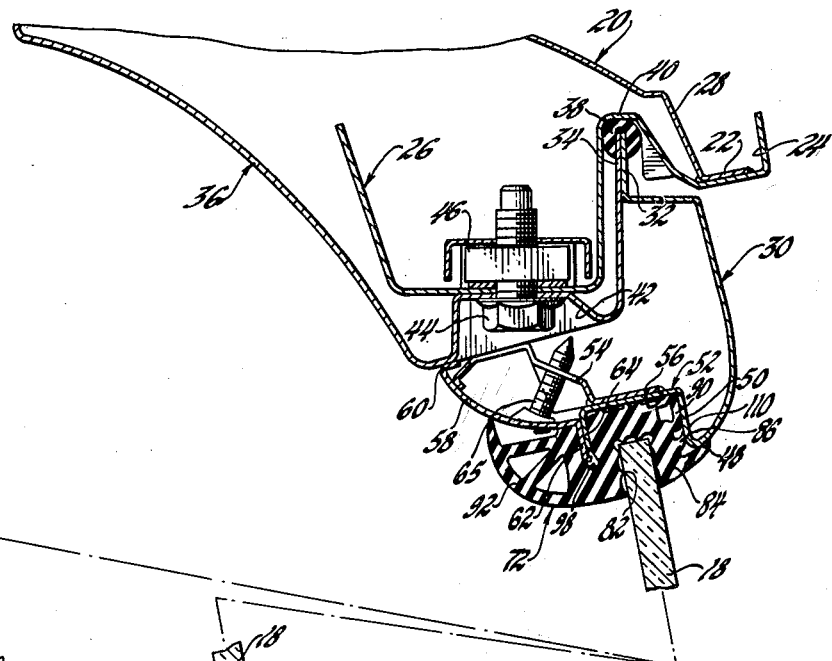
FIGURE 2 is an enlarged sectional view taken generally along the plane indicated by the line 2—2 of FIGURE 1.
Figure 2:
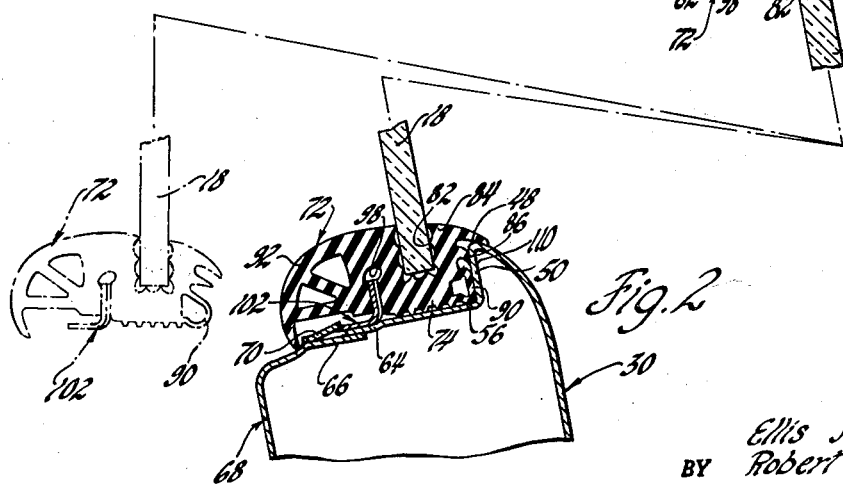

As shown in FIGURE 2 of the drawings, the roof panel 20 of the body includes an outer laterally extending flange 22 which is welded or otherwise rigidly secured to the base of an angle flange 24 of a header member 26. Flange 24, flange 22 and the adjacent portion 28 of the roof panel 20 provide the drip molding or gutter for the body 10. The outer body panel member 30 terminates at its upper edge in an inset flange 32 which is welded to a flange 34 of a halo member 36 in order to provide a pinchweld structure. A weatherstrip 38 is mounted on the pinchweld structure provided by the flanges 32 and 34, with this weatherstrip being received within a channel 40 provided in the header member 26. The halo member 36 further includes a plurality of spaced apertured embossments 42, and a number of bolts 44, one for each embossment, extend through the apertures in the embossments into threaded engagement with caged nuts 46 mounted on the header member 26 in order to rigidly secure members 30 and 36 to the members 20 and 26.

Member 30 merges on an arcuate juncture rib 48 into a flange on outer wall portion 50 of a channel 52. Channel 52 is provided only along the upper side or edge of the window opening 14, as will be further described. A reinforcing member 54 welded to the flange or base wall portion 56 of channel 52 extends upwardly and inwardly into engagement with the halo member 36, with member 54 being suitably apertured opposite each embossment 42 to allow for the insertion of the bolts 44 through this member into threaded engagement with the caged nuts 46. The openings in the member 54 are closed by a closure member 58, the upper flanged edge 60 of which bears against the halo member 36 and the lower flanged edge 62 of which bears against the flange or inner wall portion 64 of channel 52, with member 58 being bolted at 65 to member 54.

As best shown in FIGURE 2 of the drawings, at the front and rear sides or edges and at the lower side or edge of the window opening 14, the flange or inner wall portion 64 of the channel 52 is bent laterally inwardly in general alignment with the base wall portion 56 of the channel 52, with this wall portion 64 overlapping and being secured to an inwardly extending flange 66 of the inner body panel member 68. Thus the channel 52 is provided only along the upper side or edge of the window opening 14, and further the body pinchweld structure provided by the wall portion 64 of member 40 is provided only along the upper side or edge of the window opening.

Wall portion 64 is provided with a plurality of outwardly embossed abutments 70 at the side edges and the lower edge of the window opening 14, as shown in FIGURE 3, with two such abutments being provided at the side edges of the window opening and four such abutments being provided at the lower edge of the window opening.

A weatherstrip 72 is provided in order to both mount and seal the window 18 within the window opening 14. The details of the weatherstrip are best seen in FIGURE 5 of the drawings. Weatherstrip 72 includes a body or base section 74 provided with a ribbed outer surface 76. A pair of legs 78 and 80 extend laterally to the base section 74, with legs 78 and 80 and the intermediate portion of the base section 74 providing a channel 82 for the reception of the edge portion of the window 18. The sides and bottom of the channel 82 are ribbed for increased window retention and sealing. A combination sealing and trim molding arcuate lip 84 extends laterally from the upper edge of the leg 80. Lip 84 is spaced from an intermediate lip 86 which extends laterally from an intermediate portion of the leg 80, with the lips 84 and 86 defining a channel 88 for the reception of the rib 48 of the body member 30 as will be further described. A hollow compressible rib 90 interconnects the base section 74 and the leg 86. An arcuate lip or wing 92 extends from the upper end of a lip 94, with leg 94 being secured to lip 78 by a juncture portion 96 which is further joined to the lip or wing 92. Legs 78 and 94 define a channel 98 for receiving the body pinchweld structure and the locking members as will be further described. Lip 92 provides the inner garnish or trim molding and is reinforced with respect to the leg 94 by a pair of radiating ribs 100.

In order to mount the window 18 within the window opening 14, the weatherstrip 72 is first assembled to the window by inserting the edge portion of the window within the channel 82 of the weatherstrip. Thereafter, a plurality of angular locking members 102 are assembled to the weatherstrip within the channel 98. Each locking member 102, as shown in FIGURE 6, includes a flat leg 104 and a leg 106 provided with a plurality of spaced ribs 108. When the locking members are assembled to the weatherstrip, the leg 106 of the locking member is inserted within the channel 98 of the weatherstrip, with the leg 104 being positioned outwardly of and closely adjacent to the lower free end of the lip 94. A locking member is inserted within channel 98 at the portions of the weatherstrip corresponding to the front and rear sides or edges of the window opening 14, and a pair of locking members are inserted within the channel 98 at the portions of the weatherstrip corresponding to the lower edge or side of the window opening.

Thereafter the operator first angularly inserts the window, weatherstrip, and locking member assembly within the upper edge or side of the window opening 14 from the interior of the body to locate the base 74, rib 90, and lip 86 of the portion of the weatherstrip corresponding to this edge or side of the window opening within the channel 52, as shown in FIGURES 2 and 3. The flange 62 of member 58 and the inner wall 64 of the channel 52, the latter providing the body pinchweld structure, are received within the channel 98 of the weatherstrip. Thereafter the operator swings or pivots the assembly outwardly of the body until the legs 104 of each of the locking members slide over and snap behind the abutments 70 provided on the flange 66 of member 68 to fixedly mount the window within the window opening.

When the window is mounted in place, the base section 74 of the weatherstrip is compressed so that the rib 48 of the outer body member 30 is partially received within the channel 88, as shown in FIGURE 2, with the lip 86 being depressed downwardly and engaging wall 50 at 110, and the rib 90 being partially collapsed so that it conforms to the outer wall 50 of the channel 52. The lip 84 overlies rib 48 to thereby seal the window opening 14 from the exterior of the body and the wing or lip 92 bears against the flange 66 inwardly of the abutments 70 to thereby conceal these abutments and the bolts 65 and provide the inner trip or garnish molding.

Removal of the window is easily effected by prying each of the locking members 102 up and over the abutments 70.

Thus the invention provides a new and improved window mounting means which allows a fixed vehicle window to be easily and quickly mounted on a vehicle body from the interior thereof. Further, the invention provides a window mounting means which includes a new and improved weatherstrip which is adapted to mount a fixed vehicle window on a vehicle body and to seal the window within the window opening against the entry of either air or moisture.

What is claimed is:

1. In combination with a vehicle body having a closure opening therein and a wall portion for said opening extending generally parallel to the plane thereof, flange structure at one portion of said opening extending generally parallel to the plane thereof and spaced from said wall portion, a closure adapted to close said opening, weatherstrip means provided with first channel means therein for receiving the edge portion of said closure and second channel means therein for receiving said flange structure to mount said weatherstrip means on said body between said flange structure and said wall portion at said one portion of said opening, locking means mounted within said second channel means at the other portions of said opening, and means on said body removably engageable with said locking means to mount said weatherstrip on said body between said locking means and said wall portion at said other portions of said opening.

2. In combination with a vehicle body having a closure opening therein and a wall portion for said opening extending generally parallel to the plane thereof, flange structure at one portion of said opening extending generally parallel to the plane thereof and spaced from said wall portion, a closure adapted to close said opening, weatherstrip means provided with first channel means therein for receiving the edge portion of said closure and second channel means therein for receiving said flange structure to mount said weatherstrip means on said body, said weatherstrip means being compressed between said flange structure and said wall portion at said one portion of said opening, locking means mounted within said second channel means at the other portions of said opening, and means on said body engageable with said locking means to mount said weatherstrip on said body, said weatherstrip means being compressed between said locking means and said wall portion at said other portions of said opening.

3. In combination with a vehicle body having a polygonally-shaped closure opening therein and a wall portion for said opening extending generally parallel to the plane thereof, flange structure at one side of said opening extending generally parallel to the plane thereof and spaced from said wall portion, a closure adapted to close said opening, weatherstrip means provided with first channel means therein for receiving the edge portion of said closure and second channel means therein for receiving said flange structure to mount said weather strip means on said body between said flange structure and said wall portion at said one side of said opening, spaced locking means mounted within said second channel means at the other sides of said opening, and spaced means on said body engageable with said locking means to mount said weatherstrip on said body between said locking means and said wall portion at said other sides of said opening.

4. In combination with a vehicle body having a closure opening therein and a wall portion for said opening extending generally parallel to the plane thereof, flange structure at one portion of said opening extending generally parallel to the plane thereof and spaced from said wall portion, a closure adapted to close said opening, weatherstrip means provided with first channel means therein for receiving the edge portion of said closure and second channel means therein for receiving said flange structure to mount said weatherstrip means on said body between said flange structure and said wall portion at said one portion of said opening, a plurality of locking members mounted within said second channel means at the other portions of said opening, and abutment means on said body engageable with said locking means to mount said weatherstrip on said body between said locking means and said wall portion at said other portions of said opening.

5. In combination with a vehicle body having a closure opening therein and a wall portion for said opening extending generally parallel to the plane thereof, flange structure at one portion of said opening extending generally parallel to the plane thereof and spaced from said wall portion, a closure adapted to close said opening, weatherstrip means provided with first channel means therein for receiving the edge portion of said closure and second channel means therein for receiving said flange structure to mount said weatherstrip means on said body between said flange structure and said wall portion at said one portion of said opening, a plurality of angle locking members having one leg mounted within said second channel means at the other portions of said opening, and spaced shoulders on said body engageable with the other legs of said locking members to mount said weatherstrip on said body between said locking members and said wall portion at said other portions of said opening.

References Cited in the file of this patent

UNITED STATES PATENTS

| | | |
|---|---|---|
| 2,766,494 | Stremmel | Oct. 16, 1956 |
| 2,794,218 | Ramsay | June 4, 1957 |
| 2,812,558 | Lobanoff | Nov. 12, 1957 |
| 2,823,430 | Morton | Feb. 18, 1958 |
| 2,968,845 | Dickinson | Jan. 24, 1961 |

FOREIGN PATENTS

| | | |
|---|---|---|
| 152,419 | Australia | July 17, 1953 |
| 623,596 | Great Britain | May 19, 1949 |